Nov. 5, 1929.  A. E. SCHEIN  1,734,273
THRUST BEARING
Filed July 14, 1925  3 Sheets-Sheet 1

Inventor
ALEXANDER E. SCHEIN.
By Herbert H. Thompson
his Attorney

Nov. 5, 1929.　　　　A. E. SCHEIN　　　　1,734,273
THRUST BEARING
Filed July 14, 1925　　　3 Sheets-Sheet 2

Inventor
ALEXANDER E. SCHEIN.
By his Attorney
Herbert H. Thompson

Nov. 5, 1929.  A. E. SCHEIN  1,734,273
THRUST BEARING
Filed July 14, 1925   3 Sheets-Sheet 3

Inventor
ALEXANDER E. SCHEIN.
By his Attorney
Herbert H. Thompson

Patented Nov. 5, 1929

1,734,273

UNITED STATES PATENT OFFICE

ALEXANDER E. SCHEIN, OF NEW YORK, N. Y., ASSIGNOR, BY MESNE ASSIGNMENTS, TO SPERRY GYROSCOPE COMPANY, INC., A CORPORATION OF NEW YORK

THRUST BEARING

Application filed July 14, 1925. Serial No. 43,462.

This invention relates to gyroscopic stabilizers for ships, and more particularly to the provision of auxiliary bearings for the rotor, so that the latter may be spun up to speed in the least possible time without damage to the main bearings and with a minimum expenditure of power.

On account of the large mass of the gyro rotor it is preferably carried on friction bearings of the oil film type. The static or starting friction of such bearings, however, is so great that the starting or spinning up of the rotor is extremely difficult and would require a much larger and more powerful motor for the initial rotation than is necessary to maintain the rotation. In addition, such bearings would be scored and seriously damaged if the rotor were started up with the weight of the same on the bearings, since some time is required for the oil film to build up after starting.

An object of the invention is to provide a method and means whereby the rotor may be carried by non-friction bearings during its spinning-up period and transferred to its oil film or friction bearings after it has attained a predetermined speed or after a predetermined interval.

Referring to the drawings wherein I have shown several forms, my invention may assume:

Fig. 6 is a detail of the pump for raising the rotor from the plain bearing and supporting it on the anti-friction bearing.

Figure 1:
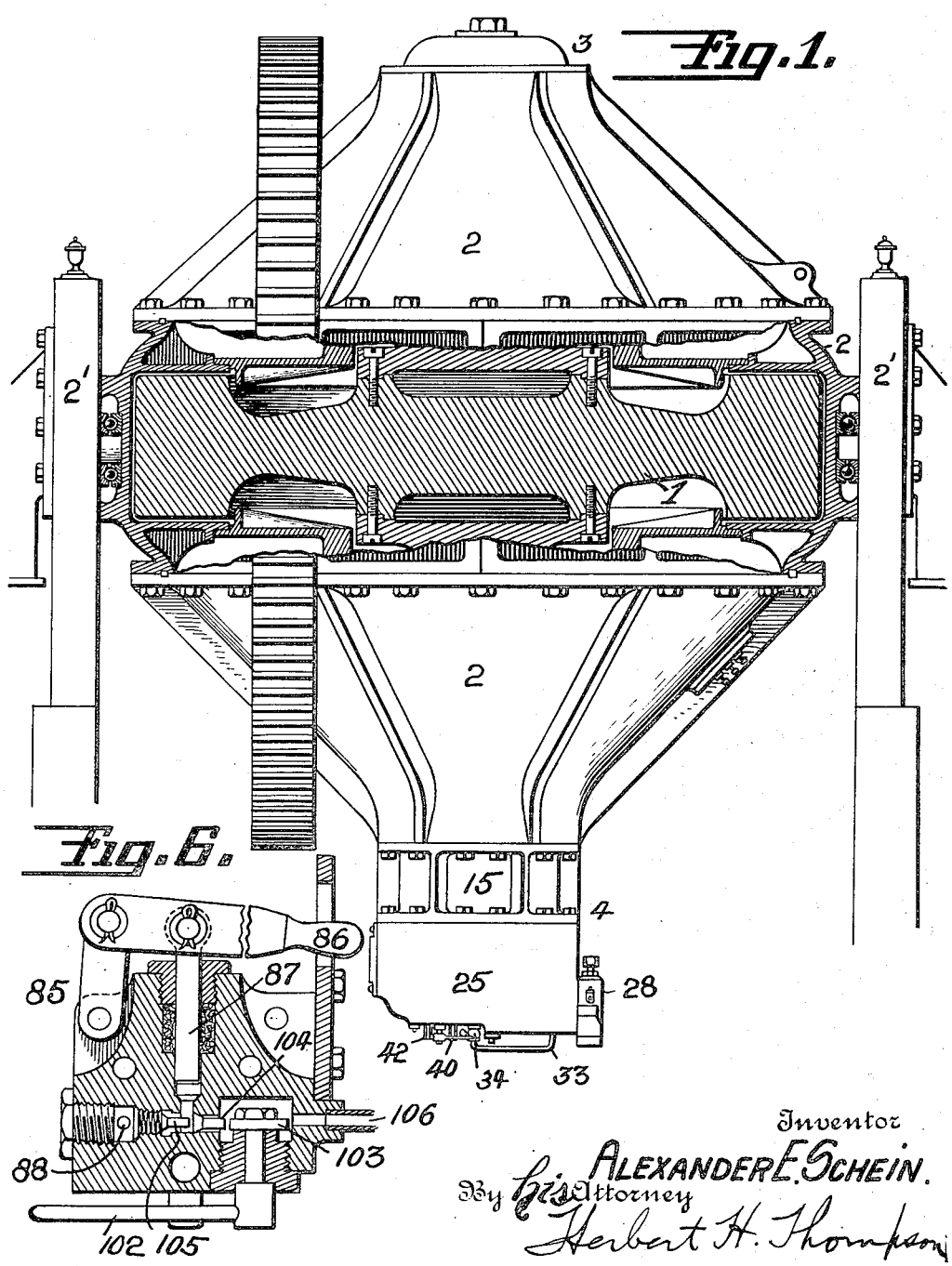
Fig. 1 is a side view of a ship stabilizer with the casing broken away to show the rotor therein.
Figure 2:
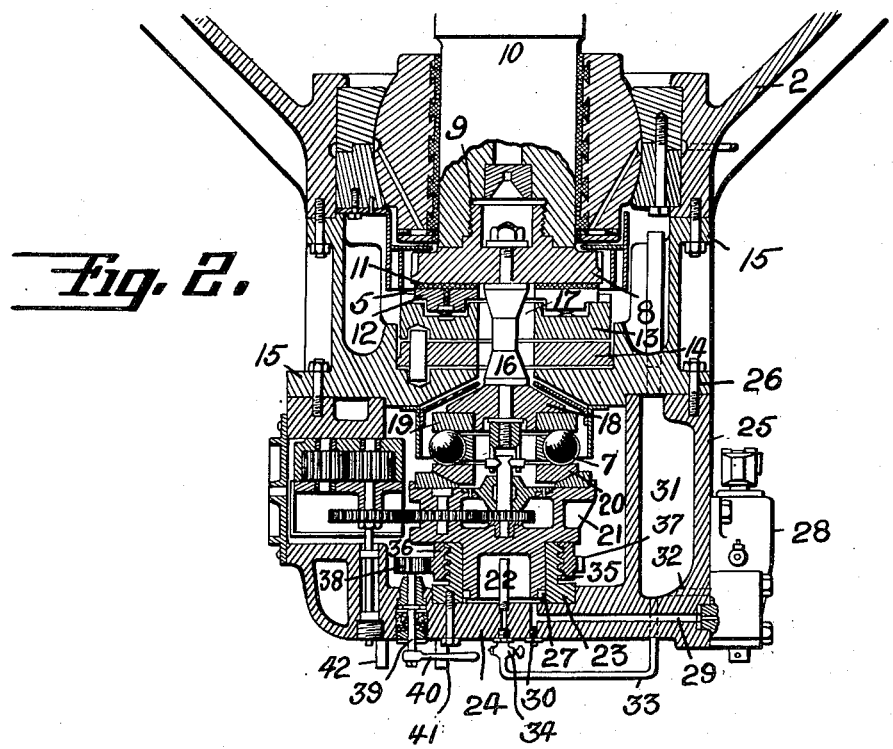
Fig. 2 is a sectional detail of the lower portion of the casing and rotor supporting bearings therein.
Figure 3:
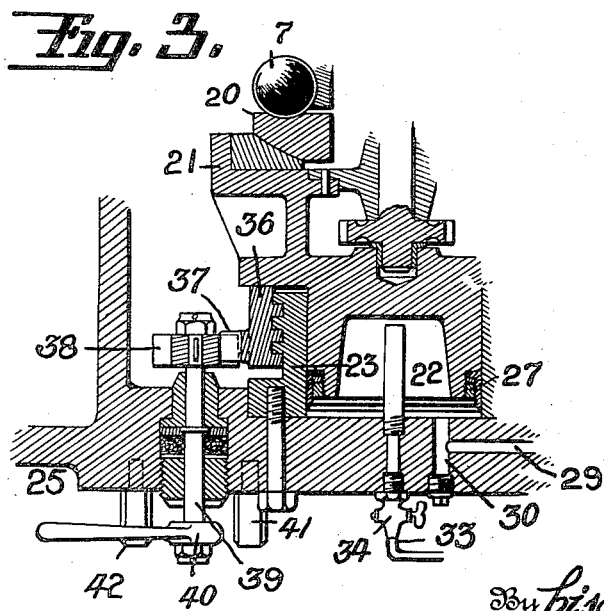
Fig. 3 is an enlarged detail showing the rotor elevating means and the collar for supporting the same.

In the drawings, 1 represents the gyroscopic rotor and 2 the casing therefor having the usual gudgeons 2' adapted to support the gyroscope for oscillation about an axis at an angle to the spinning axis of the rotor. The rotor is shown mounted within said casing on upper and lower radial bearings 3, 4 and thrust bearing 5. The latter bearing may be of the oil film type which is capable of sustaining extremely high pressures. This type of bearing, however, offers considerable resistance to starting, owing to the fact that when at rest the oil is pressed out from between the bearing surfaces, and in fact the oil film between said surfaces is not established until a given speed of rotation is attained. In order then to facilitate the starting of the rotor so that it may readily be accomplished by the motor (not shown) provided to maintain the rotation of the rotor I have provided a non-friction bearing 7 which may carry the entire weight of the rotor during the starting period, the load being transferred to the heavier bearing after a predetermined speed has been attained.

The bearing 5 may be of the usual oil film bearing construction comprising an upper shoe or plate 8 secured at 9 to the lower end of the rotor shaft 10 and resting upon the bearing surfaces 11 of self adjusting blocks 12 which are pivotally mounted on a supporting member 13 which has a knife edge bearing (not shown) on a plate 14 in turn having a knife edge bearing (not shown) at right angles to the aforementioned knife edge bearing, on the end member 15 forming an integral part of the casing 2. As the details of this bearing do not form any part of this invention further details thereof will not be necessary.

Secured to plate 8 coaxial with shaft 10 is an extension shaft 16 which projects downwardly through central openings 17 in members 13 and 14 and is provided at its lower end with a plate 18 against which the upper race 19 of ball bearing 7 is adapted to rest. The lower race 20 of this bearing is carried by a member 21, the lower portion 22 of which forms a piston fitting into a cylinder 23 integral with and having its lower end closed by the end wall 24 of a cap 25 secured at 26 to member 15 and consequently to the casing 2. Piston rings or packing 27 may be provided on piston 22.

An oil pump 28 is shown attached to cap 25 and communicating through channels 29, 30 with the inside of cylinder 23. Said pump may receive oil from a reservoir 31 through channel 32. A pipe 33 provided with a valve 34 may run from the inside of cylinder 23 to the reservoir 31. The outside of cylinder 23 may be provided with screw threads 35 engaged by an internally threaded collar 36; said collar in turn being provided with gear teeth 37 meshing with a pinion 38 fixed on a shaft 39 reaching through and bearing in the end of cap 25. A lever 40 is fixed on said shaft and may actuated between limit stops 41, 42.

As shown at 43 the upper race 19 of ball bearing 7 is normally disengaged from plate 18. Actuation of pump 28 will force oil into cylinder 23 and raise member 21, moving race 19 into engagement with plate 18. Continued actuation of said pump will raise the rotor 1 and disengage the bearing surfaces of the oil film bearing 5. The rotor will now be resting wholly on the non-friction ball bearing 7 ready for starting. While pump 28 is being actuated lever 40 may be turned, since the weight is at that time removed from the threads to cause collar 36 to follow the upward movement of member 21. When lever 40 reaches stop 42 the rotor will have been raised to the proper position. Said lever will thus serve to indicate that the rotor is riding on the ball bearing and entirely free from the friction bearing. Conversely, when lever 40 engages stop 41 it will serve to indicate that the rotor is resting on the oil film bearing and free from the ball bearing. Another important function of collar 36 is to support member 21 in the raised position to prevent lowering of the rotor in the event of leakage of oil from cylinder 23.

When the rotor has attained a speed sufficient to cause proper functioning of bearing 5, the bearing 7 may be lowered to its inoperative position and the rotor will rest on bearing 5. To lower the rotor a stroke or pump 28 may be necessary to ease collar 36 from the pressure of member 21. Lever 40 may then be thrown around to stop 41, rotating collar 36 on threads 35 and lowering it to its inoperative position. Valve 34 may then be turned to permit the oil in cylinder 23 to flow back into reservoir 31. Obviously, the passage through valve 34 may be sufficiently small to cause a slow transfer of the oil so that the raised elements will not be permitted to drop suddenly to their lower positions.

Figure 4:
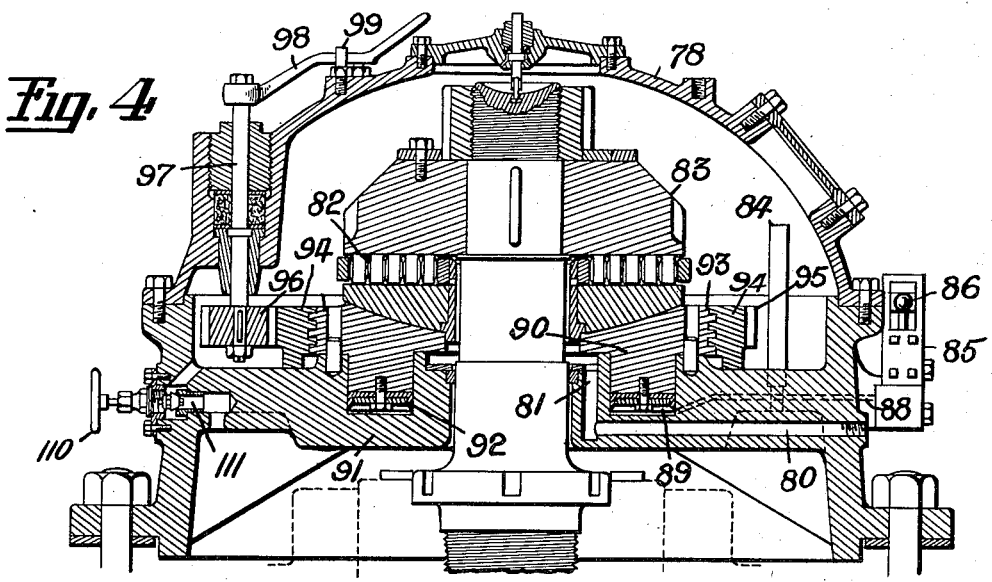
Fig. 4 is a detached sectional detail of the upper bearing showing a modification with the rotor elevating means, encased in the upper or auxiliary bearing.
Figure 5:
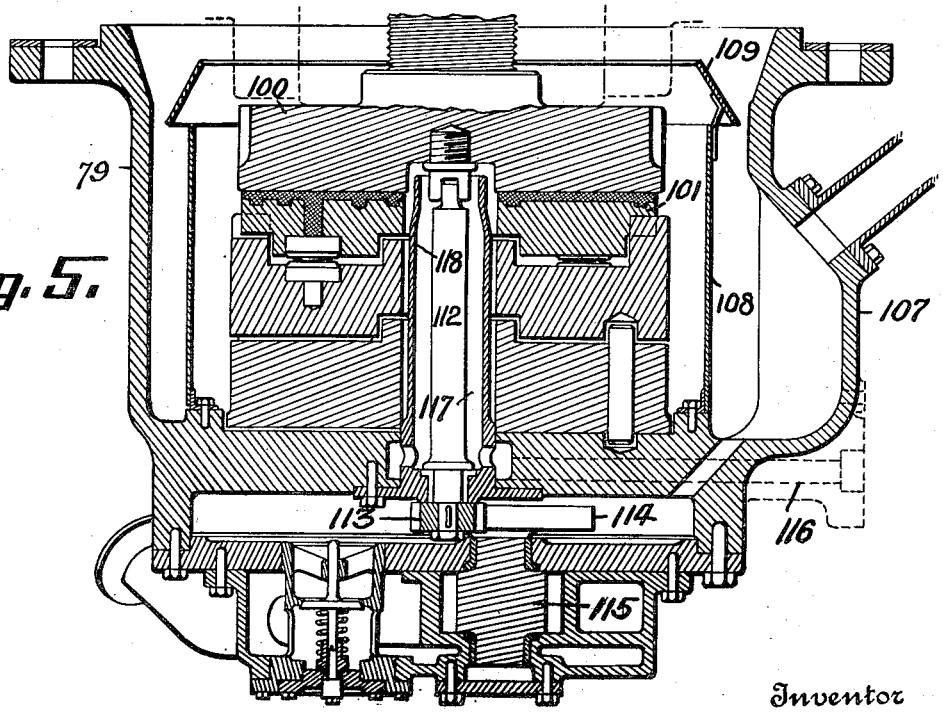
Fig. 5 is a detached sectional detail of the lower bearing used with the upper bearing of Fig. 4.

Referring now particularly to the form shown in Figs. 4 and 5, the rotor is enclosed in cone shaped casings as shown, the upper and lower casing support and carry bearing housings 78 and 79. The upper bearing is shown as having the rotor lifting device located therein. After the gyro has remained idle for some time, the weight of the rotor will have gradually squeezed out all oil from between the lower thrust collar and shoes of the step bearing. To prevent damage from wiping and at the same time obtain a low starting torque requirement, there is installed an auxiliary roller bearing located in the upper cap 78 by means of a piston and pump, which will be described in detail further on.

An oil supply pipe, (not shown) is connected to the conduit 80 where the oil is freely pumped in the channel 81, and is dispersed about the several rollers 82 between the auxiliary or starting bearing 83 until the oil is as high as the overflow pipe 84, where it will return to the reservoir at the bottom of the stabilizer where it is ready to be repumped.

To overcome the great friction of the rotor resting on the thrust collar in starting, I provide as before noted, a pump like 28, said pump 85 being adapted to be operated by a handle 86 to operate a plunger 87 causing the oil to be forced through a channel 88, into a compartment 89 formed by an annular piston 90 operating in the upper cap 91 of the stabilizer casing. Said piston is provided with packing rings 92 and on the outer side of the piston, is provided with a screw thread 93 engaging an internal threaded collar 94. The collar on its outer side is provided with teeth 95, that meshes with teeth on a pinion 96, the latter being on a shaft 97, carrying on its upper end a handle 98.

The top of the casing 78 is provided with stops 99 (only one of which is shown) for regulating the movement of the collar 94. When the pump 85 is operated, it lifts the piston 90, thus taking the weight of the stabilizer off the lower bearing, and also off the threads 94. It is then that the upper roller bearing is brought into use, lifting the entire rotating element sufficient to allow the oil supplied to the lower thrust collar to entirely separate the shoe from the collar. The pump is easily operated by hand and the whole lifting operation takes but a very short time. As the rotor is started on the upper roller suspension bearing, it is held there by the operator turning the handle 98 gradually until the handle strikes against the stop pin, thus mechanically supporting the rotor from the top. The rotor is then free to be speeded up with as little friction as possible; by reason of the speed of the rotor the wedging action of thrust bearing is sufficient to maintain a complete oil film between the lower bearing as will now be described.

As the rotor is raised it lifts the thrust collar 100 from the step bearing 101, and permits the oil to flow all over the bearing between the two parts. As has been noted when the speed of the rotor has been obtained the operator gives a few strokes of the handle 86 of the pump 85 and it lifts the collar 94 free from the cap 91 then the rotor is permitted to settle on oil that has flooded the faces of the bearings 100 and 101. As this is accomplished the handle 98 is turned around and raises threaded ring 94 free from the upper cap 91. Then the operator turns the handle 102 (see Fig. 6) causing the cam 103, carried thereby, to turn and release the valve 104 from its seat. Said valve presses at the same time a second valve 105 and opens it also, permitting the oil to flow back gradually from the cylinder surrounding the piston 90 through the channel 88 out to the return pipe 106 where it will be conveyed to the reservoir. Thus it will be seen that as the rotor settles, the oil film between the thrust bearing and the step bearing is built up and maintained by the rapidly rotating parts.

Extending from the thrust bearing housing 107, is a partition 108, having a downwardly flaring splashplate 109 thereon which catches the oil as it is transmitted from the upper surface of the upper block 100 of the thrust bearing and directs it downwardly, so that at no time may the oil go in the opposite direction and interfere with the oil descending from the upper bearing.

When it is desired for any reason to empty the upper bearing of oil, the handle 110 is turned and the channel 111 opened to drain the upper oil compartment into the lower reservoir where it may be again pumped through the system. A shaft 112 is shown connecting with the thrust collar 100 at the upper end, and has a gear 113 on its lower end meshing with a like gear 114, which in turn operates a gear oil pump 115 that keeps the oil in circulation throughout the various parts of the stabilizer.

It will be noted that the oil in the lower bearing, as shown in Fig. 5, is held to the height of the partition 108, keeping all the parts well flooded with oil, and by reason of the pump 115 it causes the oil to flow from the pump through suitable pipes, strainers and cooling means (not shown) to the various parts more particularly in this instance to the inlet 116 (shown in dotted lines) into the central channel 117 where it overflows the sleeve 118 and out through the several operating parts, filling the space between the parts and the partition 108, where it will overflow and return to the reservoir, thus affording cool oils to the various parts of the machine continuously while the rotor is revolving.

This invention is a continuation in part of my prior application, Serially numbered 413,414, gyroscopic stabilizer for ships, filed September 28th, 1920, now patent No. 1,590,778, granted June 29, 1926.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a rotatable element, a supporting member therefor, a friction bearing and a non-friction bearing for supporting said element in said member, and fluid pressure means controllable at will for shifting the load of said element from one of said bearings to the other.

2. In combination, a rotatable element, a supporting housing therefor, an oil film thrust bearing for normally rotatably supporting said element, an auxiliary normally inoperative anti-friction thrust bearing, and fluid pressure means for moving the parts thereof to place the load of said element on said anti-friction bearing in starting.

3. In combination, a rotating element, a supporting member therefor, a non-friction bearing and an oil film bearing for supporting said element in said member, and manually controlled fluid pressure means for transferring substantially the entire burden from one to the other of said bearings.

4. In combination, a rotating element, a supporting member therefor, an anti-friction bearing and an oil film bearing for supporting said element in said member, and means for transferring the burden from one to the other of said bearings, comprising a vertically movable piston, adjustable mechanical means for supporting the same, and hydraulic means also acting thereon, for taking the weight off said mechanical means when adjusting the same.

5. In combination, a rotating element, a supporting member therefor, anti-friction bearing and an oil film bearing for supporting said element in said member, fluid pressure means for transferring the burden from the film bearing to the anti-friction bearing, and additional means for maintaining the burden on said anti-friction bearing.

6. In a gyroscopic stabilizer, a supporting member, a rotor, an anti-friction bearing and an oil film bearing for supporting the rotor, fluid pressure means for transferring the burden from one of said bearings to the other by lifting the rotor, and additional means for holding the said rotor elevated after being lifted.

7. In a gyroscopic stabilizer, a supporting member, a rotor having a shaft, a pair of spaced collars forming a part of an anti-friction bearing and an oil film bearing respectively attached thereto, complementary parts for each bearing, a piston operable in said member supporting the complementary part of said anti-friction bearing, a pump connected with said piston, and a rotatable collar on the member threaded on said piston, whereby, when the pump elevates the rotor, the movable collar may be turned to support the same.

8. In a gyroscopic stabilizer, a supporting housing, a rotor having a shaft provided with non-friction and oil film bearings, a member having a piston operable therein, said piston supporting said last-named bearing, a pump connected with said piston, a threaded collar about the piston adapted to take the burden of the rotor after being raised, and a means for returning the oil through the pump to the source of supply.

9. In a vertical thrust bearing, the combination with the upper and lower bearing blocks, of an oil shield around said bearing blocks and spaced therefrom, and a downwardly flaring baffle member mounted at the top of said shield and adjacent the upper surface of the upper bearing block for the purpose specified.

10. In a vertical gyroscopic stabilizer, the combination with the rotor, of a main thrust bearing under said rotor, an auxiliary anti-friction thrust bearing above said rotor, and fluid pressure means controllable at will for transferring the load from one to the other of said bearings during the rotation of the bearing.

In testimony whereof I have affixed my signature.

ALEXANDER E. SCHEIN.